March 6, 1962 W. J. NEWBY ET AL 3,024,186
HYDROFORMING

Filed March 12, 1959 2 Sheets-Sheet 1

INVENTORS
WILLIAM JOHN NEWBY
FREDERICK WILLIAM BERTRAM PORTER
BY Morgan, Finnegan, Durham & Pine
MORGAN, FINNEGAN, DURHAM & PINE
ATTORNEYS.

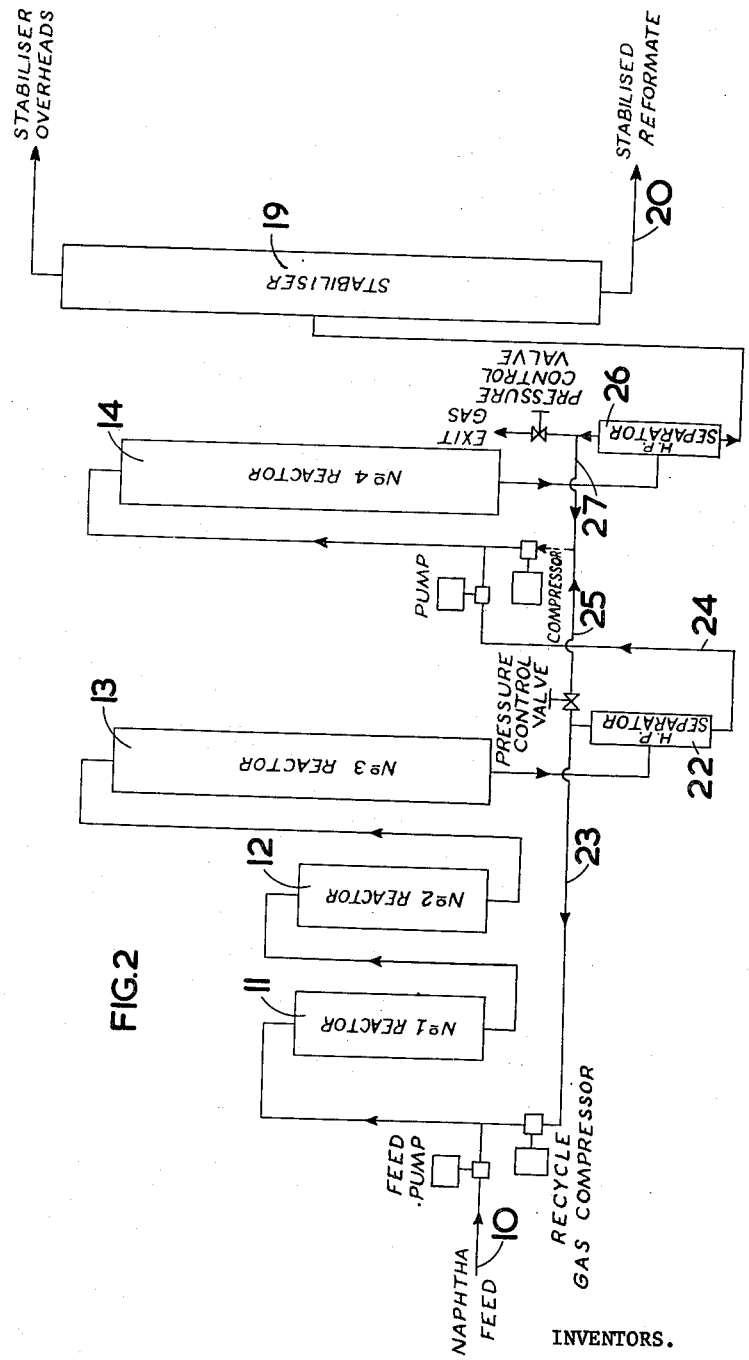

3,024,186
HYDROFORMING
William John Newby and Frederick William Bertram Porter, Sunbury-on-Thames, England, assignors to The British Petroleum Company Limited, London, England, a joint-stock corporation of Great Britain
Filed Mar. 12, 1959, Ser. No. 798,992
Claims priority, application Great Britain Mar. 18, 1958
6 Claims. (Cl. 208—65)

This invention relates to the hydroforming process for the production of motor gasoline wherein petroleum hydrocarbons of low octane number are contacted at elevated temperature and pressure with a reforming catalyst in the presence of hydrogen to give a product of increased volatility and octane number.

A catalyst commonly used in the hydroforming process consists of a small amount (normally 0.1 to 5.0% wt.) of platinum supported on alumina and in some cases the catalyst also contains a small amount (normally 0.1 to 8% wt.) of halogen such as fluorine and/or chlorine. The platinum reforming process is capable of giving a product having an octane number (research) clear, of 85 to 95 with a catalyst life of at least 40 barrels per lb. of catalyst. Under these conditions, it is not necessary to regenerate the catalyst in situ since economic operation is possible by replacing the used catalyst by a fresh charge at infrequent intervals. Regeneration of platinum reforming catalysts is possible but in the case of catalysts containing halogen, special problems may arise in replacing halogen lost during processing and regeneration.

It is now becoming necessary to produce motor gasolines of at least 100 octane number (research) clear. To do so in a single stage using platinum reforming catalysts it is necessary to use severe reaction conditions, i.e. low space velocities and high temperatures, so that the catalyst needs to be frequently regenerated if a reasonably economic catalyst life is to be obtained. In addition it may be necessary for the gasolines to have a high volatility of the order of 40 to 60% volume recovered at 100° C., in which case a relatively low boiling feedstock will be required. Since a low boiling feedstock is more difficult to upgrade, this further increases the necessity for severe reaction conditions. As indicated above, regeneration of halogen-containing platinum reforming catalysts may pose special problems while frequent regeneration of the catalyst adds considerably to the cost of the process. Furthermore, the catalyst life when producing gasoline of at least 100 octane number (research) clear is very much reduced.

It is a preferred object of the present invention to enable a motor gasoline having an octane number (research) clear of at least 100 to be produced in a more economic manner than hitherto. It is also a preferred object of the invention to produce a gasoline having in addition a high volatility of the order of 40–60% vol. recovered at 100° C.

In accordance with the present invention, a hydroforming process comprises contacting a gasoline or naphtha feedstock (i.e. one having a final boiling point of not more than 400° F.) in a first stage with a platinum reforming catalyst to give a product having an increased octane number under conditions such that regeneration of the catalyst in situ is not required, and contacting said product in a second stage with an amount of a platinum reforming catalyst less than that used in the first stage and under conditions such that regeneration of the catalyst is required, to give a final product having a still further increased octane number.

According to a preferred embodiment, the feedstock is treated in the first stage to give a product having an octane number (research) clear, of 85 to 95, and said product is treated in the second stage to give a final product having an octane number (research) clear of at least 100.

By operating in this manner, it is only necessary to regenerate the catalyst used in the second stage and although this catalyst has a relatively short life, the life of the catalyst used in the first stage, which forms a major part of the total catalyst, is much longer. It will thus be seen that the process of the invention effects considerable economy in the use of catalyst and the extent to which it is necessary to provide regeneration facilities.

According to a further feature of the invention, the platinum content of the catalyst used in the second stage calculated by weight should be such that the catalyst contains approximately 0.5 lb. of platinum per cubic foot of reactor space. The platinum content of the catalyst by weight must therefore be adjusted in accordance with the density, a less dense catalyst requiring a higher content of platinum by weight and vice versa.

The first stage of the process may advantageously be carried out in a number of reactors, preferably three, the amount of catalyst in the third and last reactor being twice the amount of catalyst used in each of the first two reactors.

The second stage of the process may advantageously be carried out in a single reactor and the amount of catalyst used in the second stage reactor is related to the total amount of catalyst used in the first stage so that, having regard to the higher space velocity in the second stage, it is possible to use process conditions in the second stage which will give a satisfactory yield of a final product of the required octane number. It should preferably be from 25 to 75% vol. of the amount in the first stage and can conveniently be about 50% vol. Thus, if the first stage be carried out in the manner indicated in the previous paragraph, the amount of catalyst used in the second stage may be approximately the same as that used in the third and last reactor of the first stage. Two or more reactors in parallel may be provided for the operation of the second stage to permit continuous operation, or, alternatively, the second stage may be carried out using a fluidised catalyst.

The first stage is advantageously carried out at a temperature of 900 to 975° F., a pressure of about 300–500 p.s.i.g., a space velocity of about 0.5 to 2.0 v./v./hr., and a molar hydrogen to hydrocarbon ratio of about 6 to 12:1. If the first stage is carried out in two or more reactors, the temperature in the last reactor is advantageously higher than in the preceding reactor or reactors. Thus, when three reactors are used, the temperature in the first two reactors may be of the order of 940° F. and the temperature in the third reactor of the order of 950° F.

The second stage is advantageously carried out at the same pressure and molar hydrogen/hydrocarbon ratio as the first stage but at a higher temperature of the order of 975–1025° F. The space velocity will be higher by an amount depending on how much less catalyst is used in the second stage.

The first stage may be carried out using a platinum reforming catalyst containing halogen since it is not necessary to regenerate this catalyst but a catalyst containing no halogen may also be used. In the second stage however, it is preferable to use a platinum reforming catalyst free of halogen since difficulties in regeneration are thereby avoided. A particularly satisfactory catalyst for use in the second stage consists of 0.5 to 1.5% weight platinum supported on an alumina base consisting wholly or in part of eta-alumina.

Various methods of carrying the invention into effect will now be described with reference to the accompanying diagrammatic drawings, wherein:

FIGURE 2 illustrates another method of operation.

Figure 1:
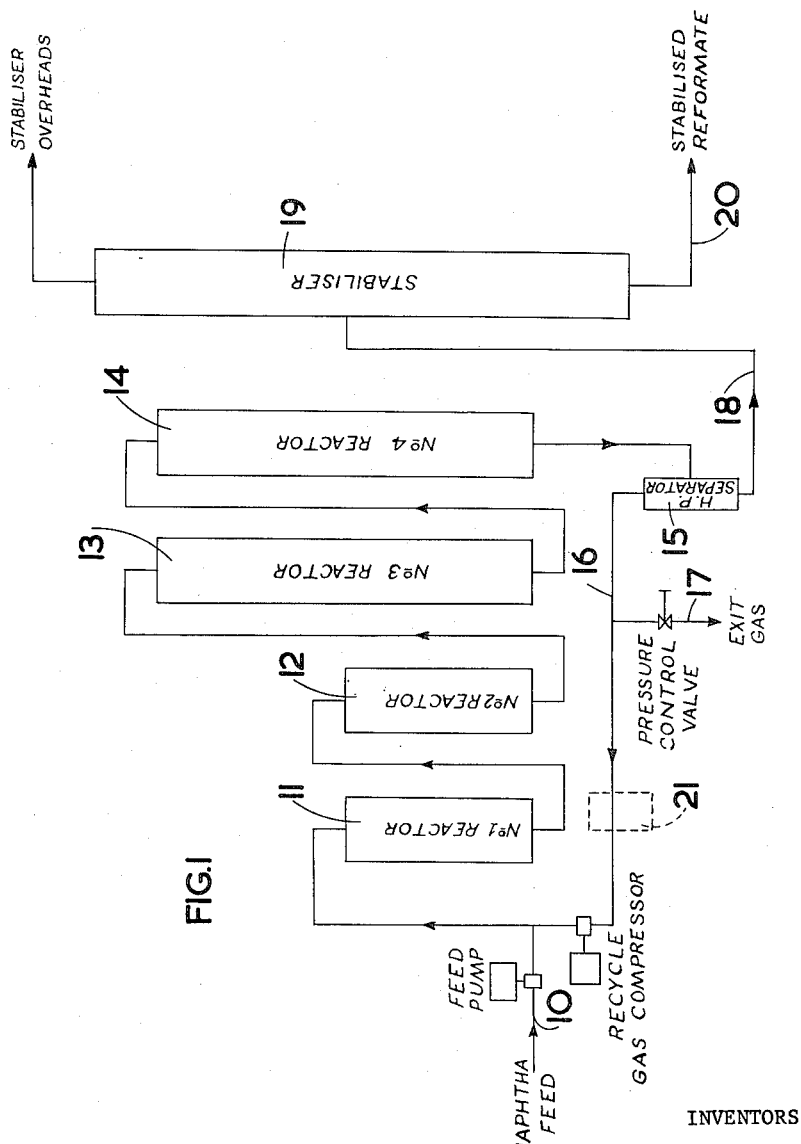
FIGURE 1 illustrates one method of operation with a modification.

A system employing a common gas recycle in the two stages is illustrated in FIGURE 1. The naphtha feed from line 10 is passed through three reactors 11, 12 and 13 in which the first stage of the process is carried out. The products from reactor 14 are passed to a separator 15 from which a hydrogen-rich recycle gas is taken via line 16, any gas in excess of that required in the process being removed via line 17. The liquid product from the separator 15 is passed via line 18 to stabiliser 19 from which stabilised reformate is removed via line 20.

If desired, the recycle gas may be passed to a hydrogen enrichment zone 21, as indicated in broken lines, where the hydrogen content of the recycle gas is increased in known manner, for example by washing with a stream of naphtha or kerosine at plant pressure to remove light hydrocarbon gases.

In order to operate the first stage to the best advantage, it is possible to operate with a split recycle gas system as illustrated in FIGURE 2. In this case the product from the last reactor 13 of the first stage is passed to a separator 22 from which a recycle gas for the first stage is taken via line 23, the liquid product from the separator 22 being passed via line 24 to the second stage reactor 14 together with a portion of the gas from the first stage fed via line 25. The product from the second stage reactor 14 is passed to a separator 26 from which a second stage recycle gas is taken via line 27, the product from the separator 26 passing to the stabiliser 19 as before. Alternatively the portion of the gas from the first stage used for the second stage may be passed through reactor 14 on a once-through basis, thereby eliminating a separate recycle gas system for the second stage.

The process of the invention will now be described with reference to the following examples.

*Example 1*

A 90–175° C. Kuwait naphtha was contacted in the first stage with a catalyst consisting of 0.739% wt. platinum, 0.47% wt. fluorine and 0.34% wt. chlorine, the balance being alumina, at a temperature of 925° F., a pressure of 500 p.s.i.g., a hydrogen/hydrocarbon mole ratio of 8.0:1, and a space velocity of 2.0 v./v./hr. of liquid feedstock. The product was obtained in 82% wt. yield and had an octane number (research) clear of 88.6.

This product was then contacted in the second stage with an amount of catalyst half that used in the first stage, consisting of 1% wt. platinum on pure eta-alumina, at a temperature of 1000° F., a pressure of 500 p.s.i.g., a hydrogen/hydrocarbon mole ratio of 8.0:1, and a space velocity of 4 v./v./hr. of liquid feedstock. The product from the second stage was obtained in 67% wt. yield on the original feedstock to the first stage and had an octane number (research) clear of 102.5 and a volatility of 36% volume recovered at 100° C.

*Example 2*

A 70–130° C. Kuwait heavy benzine was contacted in the first stage with a catalyst consisting of 0.739% wt. platinum, 0.47% wt. fluorine and 0.34% wt. chlorine, the balance being alumina, at a temperature of 960° F., a pressure of 500 p.s.i.g., a hydrogen/hydrocarbon mole ratio of 8.2:1, and a space velocity of 1.5 v./v./hr. of liquid feedstock. The product was obtained in 64% wt. yield and had an octane number (research) clear of 92.9.

This product was then contacted in the second stage with an amount of catalyst half that used in the first stage, the catalyst consisting of 0.575% wt. platinum on alumina, at a temperature of 1000° F., a pressure of 500 p.s.i.g., a hydrogen/hydrocarbon mole ratio of 8.2:1, and a space velocity of 3.0 v./v./hr. of liquid feedstock.

The product from the second stage was obtained in 53% wt. yield on the original feedstock to the first stage and had an octane number (research) clear of 100.8 and a volatility of 50% volume recovered at 100° C.

It will be seen that the use of a lighter feedstock in Example 2 enabled a high octane product of increased volatility to be obtained.

We claim:

1. A hydroforming process for the production of a petroleum product having an octane number (research) clear of at least 100 from a petroleum hydrocarbon of low octane number, comprising: contacting a petroleum feedstock having a final boiling point of not more than 400° F. with at least one fixed bed of a platinum reforming catalyst under conditions including a temperature within the range of about 900° to 975° F., a pressure within the range of about 300 to 500 p.s.i.g., a space velocity within the range of about 0.5 to 2.00 v./v./hr., and a molar hydrogen to hydrocarbon ratio within the range of about 6–12:1, to give a product having an octane number (research) clear of 85 to 95, such that the catalyst life is at least 40 barrels of said feedstock per pound of catalyst, and contacting said product in a second stage with a halogen-free platinum reforming catalyst in an amount which is from 25 to 75% vol. of the amount used in the first stage, under conditions including a temperature within the range of about 975° to 1025° F., a pressure within the range of about 300 to 500 p.s.i.g., and a molar hydrogen to hydrocarbon ratio within the range of about 6–12:1, such that regeneration of said halogen-free catalyst in said second stage is required to give a final product having an octane number (research) clear, of at least 100.

2. A process as claimed in claim 1 wherein the final product has a volatility of from 40 to 60% volume recovered at 100° C.

3. A process as claimed in claim 1 wherein the platinum content of the catalyst used in the second stage is such that the catalyst contains 0.5 lb. of platinum per cubic foot of reactor space.

4. A process as claimed in claim 1 wherein the second stage catalyst consists of 0.5–1.5% wt. of platinum on an alumina base containing at least a proportion of eta-alumina.

5. A process as claimed in claim 1 wherein a hydrogen-rich recycle gas is passed in series through both stages.

6. A process as claimed in claim 1 wherein a hydrogen-rich gas is recycled through the first stage and a portion of this gas is used for the second stage.

References Cited in the file of this patent

UNITED STATES PATENTS

| | | |
|---|---|---|
| 2,710,827 | Gornowski | June 14, 1955 |
| 2,739,927 | Doumani | Mar. 27, 1956 |
| 2,765,264 | Pasik | Oct. 2, 1956 |
| 2,853,436 | Roberts | Sept. 23, 1958 |
| 2,861,942 | Beckberger | Nov. 25, 1958 |